Nov. 8, 1949  W. B. JOHNSON ET AL  2,487,246
PROCESS FOR PRODUCING EPSILON-CAPROLACTAM
Filed Dec. 11, 1945
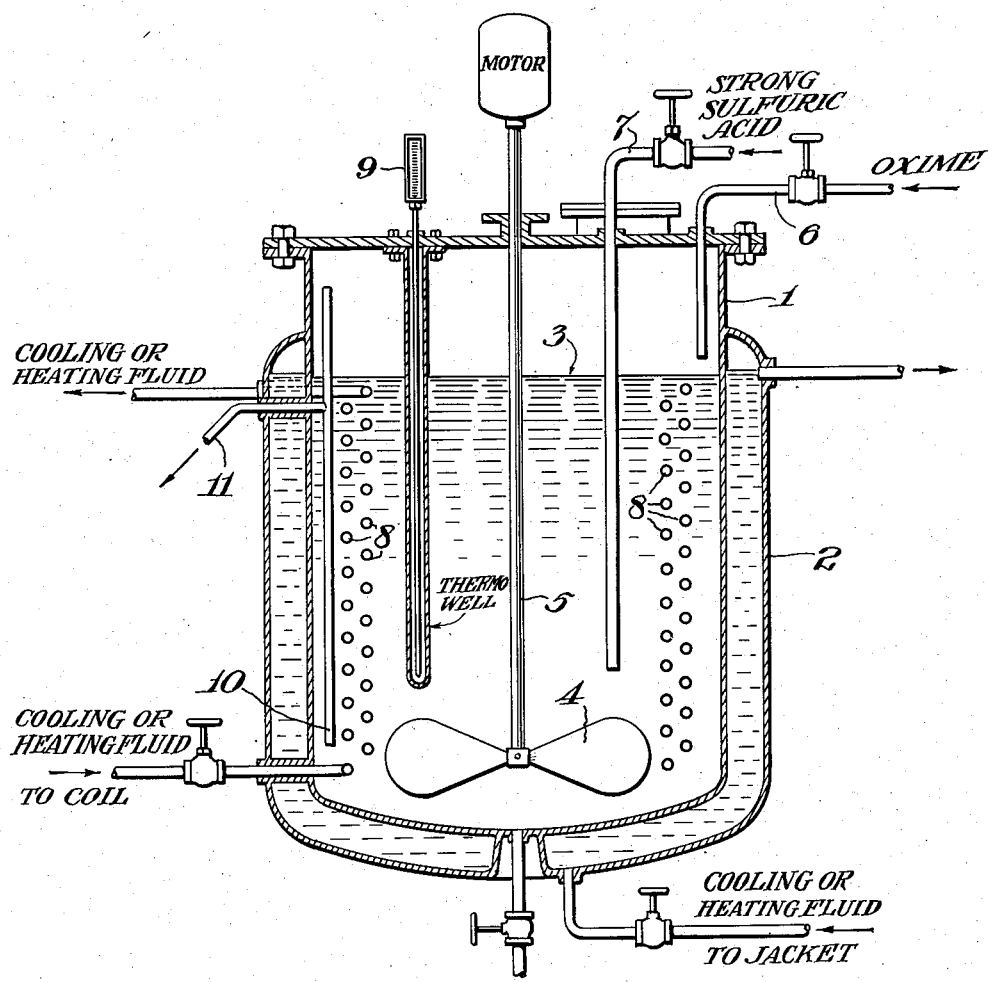
INVENTORS
WINFORD BLAIR JOHNSON &
ROBERT SAYRE MacCORMACK
BY
Thos. A. Wilson
ATTORNEY Patented Nov. 8, 1949

2,487,246

UNITED STATES PATENT OFFICE 2,487,246

PROCESS FOR PRODUCING EPSILON-CAPROLACTAM

Winford B. Johnson, Woodbury, and Robert S. MacCormack, Gibbstown, N. J., assignors to E. I. du Pont de Nemours & Company, Wilmington, Del., a corporation of Delaware Application December 11, 1945, Serial No. 634,377

1 Claim. (Cl. 260—239)

This invention relates to the manufacture of lactams by the rearrangement of cycloaliphatic ketoximes and more particularly to an efficient continuous process for the production of caprolactam.

It is a well-known procedure to prepare lactams by the Beckmann rearrangement of ketoximes by means of sulfuric acid or other suitable reagent. The most important compound of this class, epsilon caprolactam, is produced from cyclohexanone oxime in the presence of strong sulfuric acid as catalyst. The rearrangement reaction is strongly exothermic and care must be taken, especially when large scale operations are involved, to keep the reaction under control. Various procedures have been followed with this objective, such as dissolving the oxime in cold acid prior to rearrangement, extremely slow admixture of the reagents, use of an inert solvent, and the like. While processes have been developed by which a satisfactory product could be obtained, the prior art procedures have not been altogether satisfactory with respect to both efficiency and safety of operation.

An object of the present invention is a novel and efficient continuous process for the production of lactams by the rearrangement of cycloaliphatic ketoximes. A further object is such a process for the preparation of epsilon caprolactam from cyclohexanone oxime in the presence of strong sulfuric acid as catalyst. A still further object is a method for the production of caprolactam, in which increased safety of operations and high efficiency are obtained. Additional objects will be disclosed as the invention is described more at length in the following.

We have found that the foregoing advantages are accomplished, and the disadvantages of prior art processes overcome, when we effect the rearrangement of a cycloaliphatic ketoxime to the corresponding lactam by continuously introducing separately into a reactor a cycloaliphatic ketoxime and concentrated sulfuric acid, vigorously agitating the reactor contents, diluting immediately on introduction into the reaction zone each of the above ingredients with a residual acid-lactam mixture previously formed, effecting rearrangement of the ketoxime under the conditions present, continuously withdrawing lactam from the process at a point where thorough mixture has taken place and where there has been sufficient retention time to assure substantial rearrangement, and cooling the withdrawn lactam. In the manufacture of caprolactam, cyclohexanone oxime is rearranged to the desired product.

The following examples will serve to show clearly the working of the invention but will be understood to be illustrative only and not to be limiting in any way.

Example 1

A quantity of a mixture of sulfuric acid and caprolactam from a previous run amounting to 19.9 pounds, and comprising about 37% caprolactam, was introduced into a steel reactor. Sulfuric acid of 98% concentration was caused to flow continuously into the lower part of this reactor beneath the surface of the solution, while molten cyclohexanone oxime was flowed continuously onto the surface of the solution. Vigorous agitation was maintained during the addition of the two materials so that each became thoroughly mixed and diluted with the heel of solution within the reactor immediately on introduction thereinto. The temperature of the reaction mixture was maintained between a minimum of 113° and a maximum of 134° C. by means of cooling coils, the reactor also being jacketed, for further cooling if desired. Under these conditions, rearrangement of the oxime to caprolactam took place continuously in the presence of the sulfuric acid catalyst, and caprolactam in acid solution was continuously withdrawn from a point where thorough mixture had taken place. The total amount of cyclohexanone oxime introduced continuously was 20 pounds and 31.6 pounds of 98% sulfuric acid. The time of addition of these materials was about 2 hours and 16 minutes and the retention time of the oxime 68 minutes. The withdrawn caprolactam solution was cooled at once to a temperature below 75° C., in order to avoid hydrolysis. The yield on the oxime introduced was 95.5% of theoretical.

Example 2

Using substantially the same procedure as in Example 1, a heel of material from a previous run, amounting to 20.0 pounds, was introduced into the reactor. Twenty pounds of molten cyclohexanone oxime and 32.0 pounds of 97.8% $H_2SO_4$ were then caused to flow continuously into the acid-caprolactam solution under the conditions previously described, except that the temperature range during the reaction was between 117° and 141° C. and the time of addition of the materials about 34 minutes. As before, reaction products were continuously withdrawn from the system, and the caprolactam-containing solution was cooled. The yield was 94.5% of theoretical, based on the oxime.

Example 3

In the foregoing examples, the cyclohexanone oxime used was pure dry material that had been carefully prepared. The present example included processing steps for the oxime, whereby preparation of a pure dry material was made unnecessary.

Cyclohexanone oxime, prepared by the reaction of cyclohexanone with hydroxylamine sodium monosulfonate, with subsequent neutralization, was separated from the bulk of the aqueous sodium sulfate solution by filtration in the cold. The oxime product, still containing a considerable percentage of retained water, was heated to a temperature above its fusion point, where a separation took place into an oxime layer over an aqueous salt layer. The cyclohexanone oxime thus separated had a water content of 3.4% and a sodium sulfate content of 0.001%.

A quantity of a mixture of sulfuric acid and caprolactam from a previous run, amounting to 20.0 pounds, was run into a reactor. Twenty pounds of molten crude oxime, processed as described above, was then caused to flow continuously into the acid-caprolactam solution, along with 32.0 pounds of separately introduced sulfuric acid of a strength of 101.3%. The process was carried out as in Example 1, except that the average temperature during the reaction was 121° C. and the time of addition of the materials 32 minutes. Reaction products were continuously drawn off from the process and the withdrawn caprolactam-containing solution cooled immediately. The yield of caprolactam, based on the oxime used, was 92.5%. The material produced in this and the preceding examples was of good quality, having a melting point of around 69° C.

By way of further illustration, the accompanying drawing shows a form of apparatus suitable for carrying out the invention. 1 represents a reactor of acid-resistant steel, having a surrounding jacket 2, whereby cooling or heating fluid may be introduced as desired. 3 represents the level of liquid in the vessel, in which the agitator blades 4 revolve, carried on shaft 5. Oxime is run into the reactor and onto the surface of the liquid through 6, while strong sulfuric acid is fed in below the liquid surface through 7. Cooling coils 8 surround the agitator and aid in removing the reaction heat, the temperature being indicated by 9. Acid solution containing caprolactam is drawn off continuously through outlet 11, the solution being removed at 10. While the coils 8 have been designated as cooling coils, it may be desirable at times to run steam or other heating fluid therethrough, for example in bringing the initial contents of the reactor to the desired temperature.

While the examples have cited the rearrangement of cyclohexanone oxime to epsilon caprolactam, the method of invention is equally applicable to other cycloaliphatic ketoximes. Suitable oximes for such treatment are, for example, cyclopentanone oxime, cycloheptanone oxime, cyclooctanone oxime, 2- and 3-methyl cyclohexanone oximes, tertiary butyl cyclohexanone oxime, and the like.

In carrying out the process with cyclohexanone oxime, we find it important to employ sulfuric acid of a strength greater than 94%, and preferably above 98%. As a matter of fact, oleum, i. e., acid of over 100% $H_2SO_4$, is very desirable for use, particularly when wet oxime has been used, and 104% $H_2SO_4$ or stronger may be advantageous, thereby compensating for water introduced.

The oxime may be fed into the solution in the reactor in any desired manner, either in solid or molten form. The molten material is particularly favorable for use because of the ease of control of feed rate. Desirably the contents of the reactor will be at an initial temperature above the fusion point of the cyclohexanone oxime. As this oxime is commonly obtained by the reaction of hydroxylamine with cyclohexanone, operations are simplified by treating the product of this reaction in the manner described in Example 3, namely by utilizing the wet, unpurified oxime product after filtration and heating to a temperature above the fusion point, i. e., above 88–90° C. Because of the effect of dissolved water, the fusion point will doubtless be somewhat lower than the temperatures cited. At this temperature, two layers of material will be formed, a lower aqueous layer containing the greater part of the inorganic sulfate in solution, and an upper layer of the oxime containing a small percentage of dissolved water. This molten oxime layer is well adapted for introduction into the rearrangement process for the production of caprolactam.

The rearrangement is desirably carried out at a temperature between 105° and 135° C., and a suitable temperature is around 115° C. The continuous process of the present invention is highly advantageous, as it allows substantially complete reaction with a relatively brief retention time within the reactor, for example not much over 15 minutes. This is important because of the potential hydrolysis that may occur on longer time of retention, with resulting yield losses. Because of the possibility of hydrolysis, the caprolactam withdrawn from the reaction is cooled immediately to a temperature below 75° C.

In the examples, the procedure followed was to add the sulfuric acid and oxime continuously and to draw off the product continuously from the process. For the sake of accounting, however, this was done by the use of batch lots of materials. In large scale operations the process would be altogether continuous. A preferred sulfuric acid-oxime ratio is between 1.4 and 1.7, though rearrangements may be obtained with ratios as low as 1.0 or as high as 2.0.

In the rearrangement of cyclic ketoximes to lactams, it is important that the reaction rate be carefully controlled in order that the exothermic reaction shall not become explosively violent. When the oxime and sulfuric acid are brought together in the cold and the reaction initiated by heating, it is difficult to assure a safe rate of addition without undesirably low apparatus capacity. The present invention effects both rapidity and safety of reaction by several procedures. By having the various ingredients in the reactor at relatively elevated temperature at the outset, immediate reaction takes place and the false sense of security is avoided that might come if the materials were contacted cold. Moreover, use of cyclohexanone oxime in molten form permits controlled addition of the desired amount, as well as more rapid dispersion of the material in the acid solution than is possible when solid oxime is used. With the vigorous agitation maintained throughout the solution in the reactor, dilution and immediate thorough mixture of the ingredients are assured. Because of this rapid mixture and the elevated temperature conditions, reaction takes place relatively quickly and only a short retention time for the material in the reactor is necessary. This means not only increased capacity for given equipment but also assurance that substantially no decomposition of lactam will take place.

The invention has been described clearly in the foregoing but it will be understood that many variations may be introduced in details of procedure and conditions without departure from the scope of the invention. We intend to be limited only by the following claim.

We claim:

A process of producing epsilon caprolactam from wet cyclohexanone oxime contaminated with water-soluble inorganic material, which comprises subjecting said wet contaminated oxime to a temperature above its fusion point, thereby effecting separation of a layer of cyclohexanone oxime above the aqueous layer containing the water-soluble contaminant, continuously introducing separately into a reactor maintained at elevated reaction temperature the separated molten cyclohexanone oxime and sulfuric acid of a concentration above 98%, vigorously agitating the reactor contents, dispersing immediately on introduction into the reaction zone each of said materials throughout the hot residual acid-caprolactam mixture, thus effecting rearrangement of the cyclohexanone oxime, continuously withdrawing caprolactam from the process at a point such as to allow prior thorough mixture and rearrangement, and rapidly cooling the withdrawn caprolactam.

WINFORD B. JOHNSON.
ROBERT S. MacCORMACK.

REFERENCES CITED

The following references are of record in the file of this patent:

UNITED STATES PATENTS

| Number | Name | Date |
|---|---|---|
| 2,221,369 | Cass | Nov. 12, 1940 |
| 2,249,177 | Schlack | July 15, 1941 |
| 2,313,026 | Schlack | Mar. 2, 1943 |
| 2,351,381 | Wiest | June 13, 1944 |